US009283909B2

(12) United States Patent
Röttger et al.

(10) Patent No.: US 9,283,909 B2
(45) Date of Patent: Mar. 15, 2016

(54) DEVICE FOR ABSORBING ENERGY IN THE EVENT OF A VEHICLE COLLISION

(71) Applicant: Thyssenkrupp Steel Europe AG, Duisburg (DE)

(72) Inventors: Rolf Peter Röttger, Mülheim/Ruhr (DE); Martin Kibben, Dinslaken (DE); Markus Zörnack, Attendorn (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/752,247

(22) Filed: Jun. 26, 2015

(65) Prior Publication Data

US 2015/0375702 A1 Dec. 31, 2015

(30) Foreign Application Priority Data

Jun. 26, 2014 (DE) .......................... 10 2014 108 979

(51) Int. Cl.
*B60R 19/34* (2006.01)
*B62D 21/15* (2006.01)
*B60R 19/03* (2006.01)
*B60R 19/24* (2006.01)

(52) U.S. Cl.
CPC ................. *B60R 19/34* (2013.01); *B60R 19/03* (2013.01); *B62D 21/15* (2013.01); *B60R 2019/245* (2013.01)

(58) Field of Classification Search
CPC .. B60R 19/26; B60R 19/34; B60R 2019/245; B61G 11/16; F16F 7/12; F16F 7/123; F16F 7/128
USPC .......................................... 293/132, 133, 155
See application file for complete search history.

(56) References Cited

U.S. PATENT DOCUMENTS

| 3,138,118 | A | * | 6/1964 | Dean | B61G 9/18 105/392.5 |
|---|---|---|---|---|---|
| 5,154,253 | A | * | 10/1992 | Vollmer | B60K 5/12 180/232 |
| 6,409,239 | B1 | * | 6/2002 | Tjoelker | F16F 7/127 188/376 |
| 7,503,603 | B2 | * | 3/2009 | Braunbeck | B60R 19/34 293/133 |
| 2007/0120384 | A1 | * | 5/2007 | Parkinson | B60R 19/34 293/132 |
| 2008/0238142 | A1 | * | 10/2008 | Braunbeck | B60R 19/34 296/187.03 |
| 2009/0243312 | A1 | * | 10/2009 | Handing | B60R 19/26 293/132 |
| 2010/0320782 | A1 | * | 12/2010 | Akgun | B60R 19/34 293/133 |
| 2011/0089707 | A1 | * | 4/2011 | Perarnau Ramos | F16F 7/125 293/132 |
| 2015/0001866 | A1 | * | 1/2015 | Noyori | B60R 19/34 293/133 |
| 2015/0102615 | A1 | * | 4/2015 | Alavandi | B60R 19/34 293/133 |

* cited by examiner

*Primary Examiner* — Gregory Blankenship
(74) *Attorney, Agent, or Firm* — Lathrop & Gage LLP

(57) ABSTRACT

A device for absorbing energy in the event of a vehicle collision includes a body component of a motor vehicle, a thrust body for transmitting force, and a metal band for absorbing energy. The body component has a guide for the thrust body, and the body component has a deviating point for the deviating of the metal band. The thrust body has a fastening point for the fastening of the metal band. The metal band is coupled to the deviating point of the body component and to the fastening point of the thrust body such that the metal band is subjected to a tensile load when the thrust body is pushed into the guide of the body component. A distance between the deviating point and the fastening point is selectively adjustable.

19 Claims, 3 Drawing Sheets

DEVICE FOR ABSORBING ENERGY IN THE EVENT OF A VEHICLE COLLISION

RELATED APPLICATIONS

This application is a continuation of German Patent Application 102014108979.0, filed Jun. 26, 2014, the disclosure of which is incorporated herein by reference.

BACKGROUND

In the field of automotive engineering, numerous devices are known which are intended to absorb, that is to say accommodate, energy that is generated in the event of a vehicle collision. Such devices are also referred to as "crash boxes". Crash boxes are arranged for example between the bumpers and the longitudinal members of a vehicle. Up to a certain collision speed, all of the energy can be absorbed by the crash box. This has the advantage that, up to said collision speed, only the crash box is damaged, whereas expensive damage to further components, for example a deformation of the longitudinal member, is prevented. After an accident, it is then merely necessary for the crash box to be exchanged. The demand for easily and cheaply exchangeable crash boxes is based inter alia on cheaper vehicle insurance categories.

A device, which can be regarded as a crash box, for absorbing energy is known for example from DE 41 28 768 A1. The "crash box" presented in said document is illustrated in FIGS. 1A and 1B. A disadvantage of the described crash box is its characteristic that the maximum amount of energy that can be absorbed is constant, and cannot be changed. This has the disadvantage that the crash box cannot be used universally. Rather, for different vehicle types, it is necessary, owing to their different dimensions and their different vehicle masses, to also design and use different crash boxes which are adapted to the respective amount of energy that must be absorbed.

U.S. Pat. No. 3,694,019 A has disclosed a device in which the amount of energy to be absorbed in the event of a collision can be adjusted. For this purpose, it is proposed that the energy be absorbed through the plastic deformation of a thermoplastic filament which is wound around two bolts which are movable relative to one another. The amount of energy that can be absorbed can be adapted by varying the number of windings: if more filament windings are provided, the cross-sectional area of the energy-absorbing material, and thus the amount of energy that can be absorbed, are increased; if fewer filament windings are provided, it is by contrast the case that the cross-sectional area of the energy-absorbing material, and thus the amount of energy that can be absorbed, are reduced.

Even though the device known from U.S. Pat. No. 3,694,019 A permits an adjustment of the amount of energy that can be absorbed, multiple disadvantages remain evident. For example, the production of the filament windings has proven to be particularly cumbersome. Furthermore, the use of plastics as energy-absorbing material has the disadvantage, in relation to metals, of lower thermal and mechanical resistance to environmental influences such as heat, cold and vibrations, which are inevitably encountered in vehicles.

A durable and nevertheless easily exchangeable device is desirable in which the amount of energy that can be absorbed in the event of a collision can be easily adjusted.

SUMMARY

The following presents a simplified summary in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a device for absorbing energy in the event of a vehicle collision includes a body component of a motor vehicle, a thrust body for transmitting force, and a metal band for absorbing energy. The body component has a guide for the thrust body, and the body component has at least one fastening point or deviating point for the fastening or deviating of the metal band. The thrust body has at least one fastening point or deviating point for the fastening or deviating of the metal band. The metal band is coupled to the fastening points or deviating points of the body component and to the fastening points or deviating points of the thrust body such that the metal band is subjected to a tensile load when the thrust body is pushed into the guide of the body component. At least one fastening point or deviating point is mounted so as to be movable and fixable relative to at least one of the body component and the thrust body.

In another embodiment, a device for absorbing energy in the event of a vehicle collision includes a body component of a motor vehicle, a thrust body for transmitting force, and a metal band for absorbing energy. The body component has a guide for the thrust body, and the body component has a deviating point for the deviating of the metal band. The thrust body has a fastening point for the fastening of the metal band. The metal band is coupled to the deviating point of the body component and to the fastening point of the thrust body such that the metal band is subjected to a tensile load when the thrust body is pushed into the guide of the body component. A distance between the deviating point and the fastening point is selectively adjustable.

In still another embodiment, a device for absorbing energy in the event of a vehicle collision includes a body component of a motor vehicle, a thrust body for transmitting force, and a metal band for absorbing energy. The body component has a guide for the thrust body, and the body component has a plurality of deviating points for the deviating of the metal band. The thrust body has a plurality of fastening points for the fastening of the metal band. The metal band is coupled to the plurality of deviating points and to the plurality of fastening points such that the metal band is subjected to a tensile load when the thrust body is pushed into the guide of the body component. A distance between at least one of the deviating points and at least one of the fastening points is selectively adjustable.

In yet another embodiment, a device is provided for absorbing energy in the event of a vehicle collision. The device includes a body component of a motor vehicle, a thrust body for transmitting force, and a metal band for absorbing energy. The body component has a guide for the thrust body, and the body component has at least one fastening point or deviating point for the fastening or deviating of the metal band. The thrust body has at least one fastening point or deviating point for the fastening or deviating of the metal band, and the metal band is coupled to the fastening points or deviating points of the body component and to the fastening points or deviating points of the thrust body such that the metal band is subjected to a tensile load when the thrust body is pushed into the guide of the body component. To provide a durable and nevertheless easily exchangeable device with which the amount of energy that can be absorbed in the event of a collision can be adjusted, at least one fastening point or deviating point is mounted so as to be movable and fixable relative to the body component and/or relative to the thrust body.

DETAILED DESCRIPTION

Figure 1A:
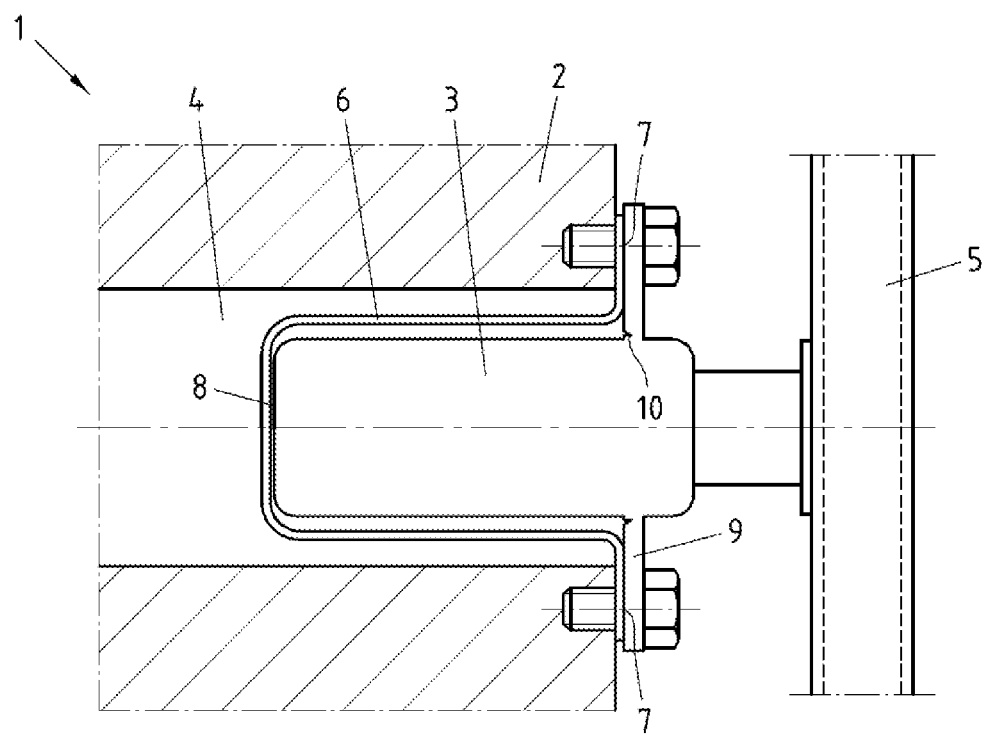
FIG. 1A shows a PRIOR ART device for absorbing energy in the event of a vehicle collision, in the unloaded state and in a plan view.

In at least one embodiment, a device for absorbing energy in the event of a vehicle collision includes at least one fastening point or deviating point mounted so as to be movable and fixable relative to the body component and/or relative to the thrust body. The device is characterized firstly by a body component of a motor vehicle. The body component is preferably a load-bearing part, for example a longitudinal member. Furthermore, the device has a thrust body for transmitting force. The thrust body serves for absorbing and transmitting onward the forces that are introduced into the bumper in the event of a vehicle collision. It is preferably provided that the thrust body is produced from metal, in particular from steel, is in the form of a hollow body, and is designed to be open at the rear side. Furthermore, the thrust body may be designed to be open at least in the region of the rear side as far as an edge at two opposite side surfaces. Furthermore, the device has a metal band for absorbing energy. The metal band is intended to be plastically deformed, in particular stretched, in the event of a vehicle collision, with energy being absorbed. The provision of the metal band specifically for the absorption of energy self-evidently does not rule out that other components too, in particular the thrust body, likewise absorb energy in the event of a vehicle collision. The body component has a guide for the thrust body. The thrust body is preferably arranged in front of said guide or even partially in said guide in order that, in the event of a vehicle collision, it can be pushed further into said guide in controlled fashion.

The body component of the device has at least one fastening point or deviating point for the fastening or deviating of the metal band. The thrust body also has at least one fastening point or deviating point for the fastening or deviating of the metal band. A fastening point is to be understood to mean a region in which the metal band is fastened to the body component or to the thrust body and can be connected to the corresponding component. This may be realized in detachable form (for example by way of a screw connection) or in non-detachable form (for example by way of a welded connection). By contrast, a deviating point is to be understood to mean a region in which the body component or the thrust body have contact with, and deviate, the metal band. This does not necessarily assume a fixed connection; rather, it suffices for the metal band to be looped around a deviating point and for forces to be introduced into the metal band in this way. The deviating points may for example be screws which, owing to the circular cross section of their shank, are particularly highly suitable as loop-around points for the metal band and which can at the same time serve for producing a connection to other components. The fastening points and the deviating points are respectively provided on different components. For example, it may be the case that only fastening points are provided on the thrust body, whereas only deviating points are provided on the body component, or vice versa.

The metal band is coupled to the fastening points or deviating points of the body component and to the fastening points or deviating points of the thrust body such that the metal band is subjected to a tensile load when the thrust body is pushed into the guide of the body component. It is preferably the case that the metal band already has a slight preload in the installed state, such that the plastic deformation of the metal band—and thus the energy absorption—begins already upon the commencement of the vehicle collision. It may advantageously be provided that the thrust body is connected to the body component exclusively via the metal band and the fastening points and/or deviating points that are provided in any case. In this way, it is possible to dispense with an additional connection, for example a screw connection.

It is provided according to embodiments of the invention that at least one fastening point or deviating point is mounted so as to be movable and fixable relative to the body component and/or relative to the thrust body. In other words, the fastening points and/or deviating points should be capable of changing their position in particular relative to the component on which they are provided, and of being fixed in the changed position relative to said component. Preferably, the fastening points or deviating points can be moved into and fixed in at least two different positions. By means of the adjustability of the fastening points and/or deviating points, it is achieved that different lengths of metal bands can be used, such that the amount of energy for absorption can be variably adapted to the vehicle model. Furthermore, it is achieved that, even using metal bands of the same length, the distance between the bumper and the body component can be adapted to the vehicle model. Owing to these characteristics, the device can be used as a "crash box" in different vehicle types.

In one embodiment of the device, it is provided that the thrust body has two fastening points for the fastening of the metal band. Through the provision of two fastening points, it is possible for the two ends of the metal band to be fastened to a respective one of said fastening points. The length of the metal band is preferably at least twice the distance between the two fastening points, such that the metal band can also be guided around one or more deviating points.

With regard to various embodiments, the metal band may be connected to the thrust body detachably, cohesively and/or in positively locking fashion at the fastening points. A detachable connection may be realized for example by way of a screw connection, and has the advantage that—for example after a vehicle collision—the metal band can be easily exchanged. A cohesive connection may be realized for example by way of a welded connection, and has the advantage that the connection is highly reliable even under high mechanical loads (for example vibrations). Metal inert gas (MIG) welding, metal active gas (MAG) welding or resistance welding have proven to be particularly suitable welding methods for this purpose. A positively locking connection may be realized for example by way of flanging, and has the advantage of particularly low production costs. The two connecting types may be combined such that, for example, a weld spot may be formed in the flanged region if required.

A further embodiment of the device provides that the thrust body is detachably connected to the body component. A detachable connection may be realized for example by way of a screw connection, and has the advantage, already mentioned above, that the thrust body can be easily exchanged for example after a vehicle collision.

In a further embodiment of the device, it is provided that the thrust body is detachably connected to a bumper. A detachable connection may be realized for example by way of a screw connection, and, in this case too, has the advantage that the thrust body and the bumper can be exchanged independently of one another, for example after a vehicle collision.

Further teaching provides that the body component is a longitudinal member of a vehicle. In particular, the body component may be a front or rear longitudinal member. Longitudinal members are among those regions of the body which exhibit particularly high rigidity. Furthermore, longitudinal members generally extend into the immediate vicinity of the front and rear ends of the vehicle. For these reasons, longitudinal members represent a particularly suitable fastening option for crash boxes which are intended for absorbing the energy of a front-end or rear-end collision.

A further embodiment of the device provides that the body component has at least one and in particular three deviating points for the deviating of the metal band. An odd number of deviating points has the advantage that the metal band can be returned in the original direction after being alternately looped around the deviating points.

With regard to this embodiment of the device, it is furthermore proposed that at least one of the deviating points is mounted so as to be movable and fixable relative to the body component. In other words, the deviating points should be capable of changing their position relative to the body component, and of being fixed in the changed position. By means of the adjustability of the deviating points, it is achieved that different lengths of metal bands can be used, such that the amount of energy for absorption can be variably adapted to the vehicle model. Alternatively or in addition, it is achieved that, even using metal bands of the same length, the distance between the bumper and the body component can be adapted to the vehicle model. The capability for adjustment and fixing may be realized for example by way of screw connections.

With regard to these embodiments, it is furthermore proposed that the deviating points have a circular cross section and are guided in elongate bores or grooves which are arranged in the body component. The circular cross section has the advantage that the metal band is uniformly curved as it is diverted, and therefore does not rupture even under high load. By means of the guidance in elongate bores or grooves, it is possible for a particular movement or adjustment direction to be predefined. Furthermore, the extent of the adjustability may be limited by way of stops.

In a further embodiment of the device, it is provided that the metal band is produced from steel, in particular from lightweight steel, for example from FeMn steel. Steel exhibits particularly high rigidity and furthermore particularly high toughness. Metal bands composed of steel can therefore absorb particularly large amounts of energy when plastically deformed. Furthermore, steel offers the advantage that it can be easily welded to adjacent components. As an alternative to this, it may be provided that the metal band is produced from aluminum. This material has the particular advantage of a low mass.

A further embodiment of the device provides that the metal band has a length in the range between 150 mm and 300 mm. It is furthermore provided that the metal band has a width in the range between 50 mm and 100 mm. Finally, it is provided that the metal band has a thickness in the range between 0.3 mm and 1.5 mm. The metal band is preferably approximately rectangular in form. The stated dimensions may represent a desirable compromise between compactness, flexibility and the capability to absorb an adequate amount of energy. For structural space reasons, it is also possible to use metal bands of smaller width (<50 mm), wherein, then, the energy absorption capability can be set by way of the thickness of the metal band.

The devices described above, in all of the embodiments presented, may be used to particular advantage in a motor vehicle. The particular suitability for this purpose arises in particular from the fact that, for the production of different vehicles, it is sought to realize a high proportion of common parts for cost reasons. Owing to the described characteristics, the device can be adapted to vehicles of different mass and size, and thus used across a range of vehicles.

Reference is now made to the accompanying figures for additional description. FIG. 1A shows a device 1 known from the prior art for absorbing energy in the event of a vehicle collision, in the unloaded state and in a plan view. The device shown in FIG. 1 corresponds substantially to the "shock-absorbing device" known from DE 41 28 768 A1 (in particular FIG. 1B, FIG. 2B thereof). The illustration firstly shows a body component 2 of a motor vehicle and a thrust body 3. The thrust body 3 is arranged in a guide 4 of the body component 2 and, outside the guide 4, is screwed to the body component 2. At the side facing away from the body component 2, the thrust body 3 is connected to a bumper 5. Furthermore, a metal band 6 for absorbing energy is provided. The metal band 6 is, by way of both ends, screwed by way of in each case one fastening point 7 to the body component 2, and is, by way of its regions situated between the ends, stretched around the thrust body 3. The rear side of the thrust body 3 can thus be regarded as a deviating point 8. The metal band 6 is stretched between the fastening points 7 of the body component 2 and the deviating point 8 of the thrust body 3 such that the metal band 6 is subjected to a tensile load when the thrust body 3 is pushed into the guide 4 of the body component 2.

The thrust body 3 can be pushed into the guide 4 of the body component 2 only when the force introduced by the bumper 5 exceeds a particular threshold value, such as may be the case for example in the event of a front-end collision. When said threshold value is overshot, the thrust body 3 detaches from retaining arms 9 to which it was previously connected by way of predetermined breaking points 10.

Figure 1B:
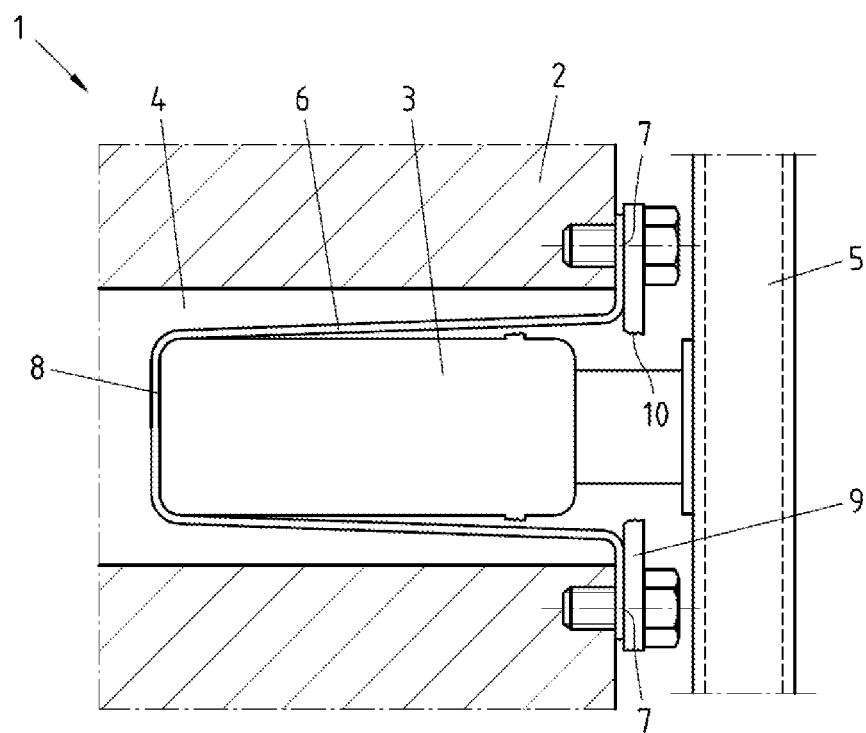
FIG. 1B shows the PRIOR ART device from FIG. 1A in the loaded state.

FIG. 1B illustrates the device from FIG. 1A in the loaded state. The features already described in conjunction with FIG. 1A are denoted by the same reference signs in FIG. 1B. A loaded state is to be understood for example to mean a state after a collision and an associated plastic deformation of the metal band 6. It can be seen in FIG. 1B that the thrust body 3, together with the bumper 5 fastened thereto, has been pushed to the left, into the guide 4 of the body component 2. For this purpose, the thrust body 3 has detached from the retaining arms 9 at the two predetermined breaking points 10. The action of the thrust body 3 being pushed into the guide 4 of the body component 2 causes a tensile load to be exerted on the metal band 6, which in turn leads to intense stretching of the metal band 6. As it stretches, the metal band 6 absorbs the energy of the collision, without the other components, in particular the body component 2, being damaged in the process, and said metal band can be exchanged relatively easily and inexpensively after the collision.

Figure 2A:
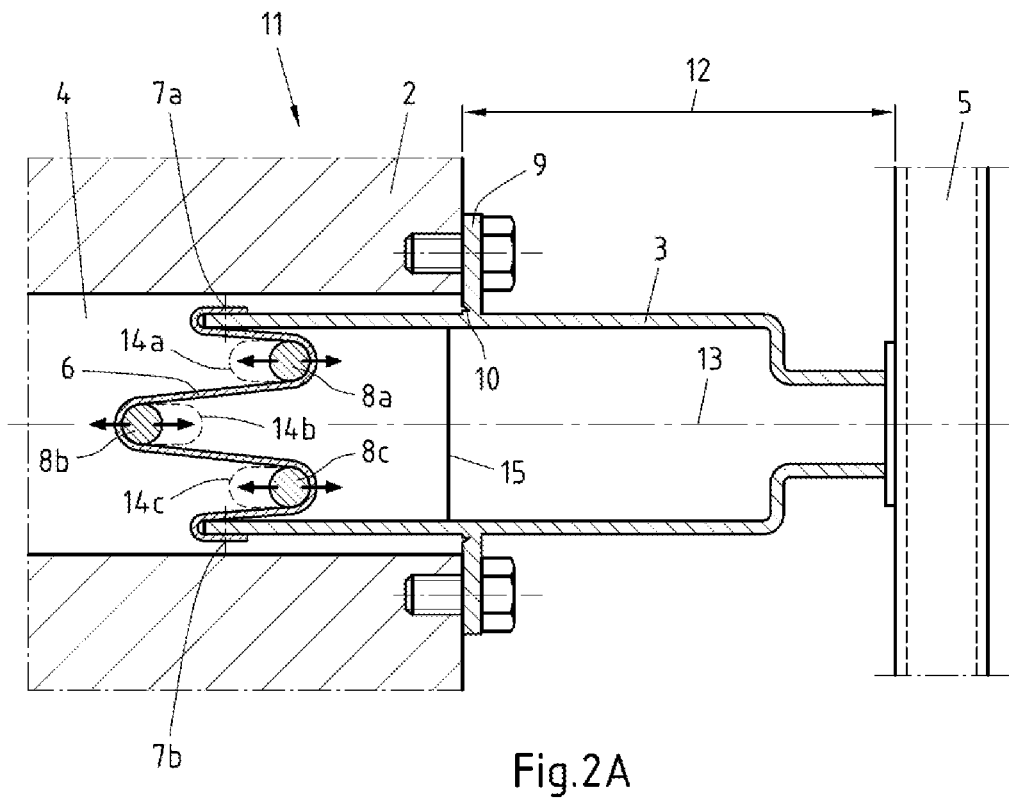
FIG. 2A shows a first embodiment of a device according to the current invention for absorbing energy in the event of a vehicle collision, in the unloaded state and in a plan view.

FIG. 2A shows a first embodiment of a device 11 according to the invention for absorbing energy in the event of a vehicle collision, in the unloaded state and in a plan view. The features already described in conjunction with FIG. 1A and FIG.

1B are denoted by the same reference signs in FIG. 2A. The device 11 shown in FIG. 2A differs from the device 1 known from FIG. 1A and FIG. 1B in numerous aspects. A first difference lies in the fact that the two fastening points 7a, 7b for the fastening of the ends of the metal band 6 are provided not on the body component 2 but on the thrust body 3. Instead, on the body component 2, there are provided three deviating points 8a, 8b, 8c for the deviating of the metal band 6. The metal band 6 is coupled to the two fastening points 7a, 7b of the thrust body and to the three deviating points 8a, 8b, 8c of the body component such that the metal band 6 is subjected to a tensile load when the thrust body 3 is pushed into the guide 4 of the body component 2. Owing to the coupling of the metal band 6, positioning of the thrust body 3 relative to the body component 2 is also realized, such that the retaining arms 9, with their predetermined breaking points 10, are merely optionally present.

Figure 2B:
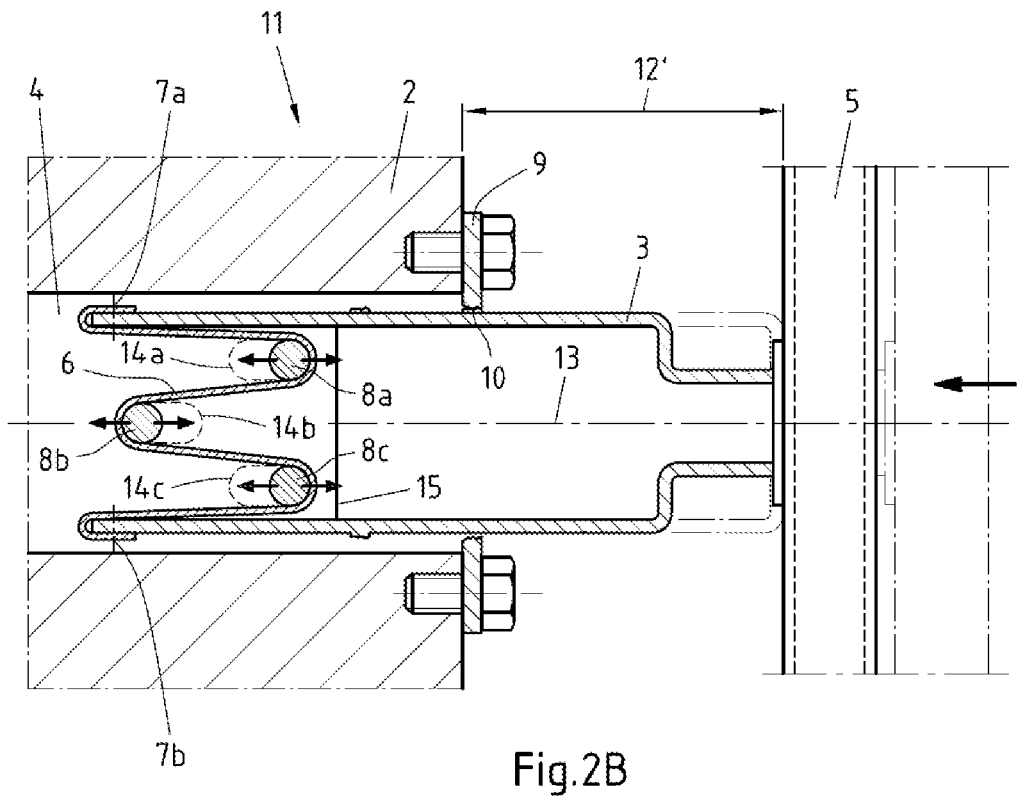
FIG. 2B shows the device from FIG. 2A in the loaded state.

FIG. 2B shows the device from FIG. 2A in the loaded state. The features already described in conjunction with FIG. 1A, FIG. 1B and FIG. 2A are denoted by the same reference signs in FIG. 2B. FIG. 2B also shows, similarly to FIG. 1B, a state after a collision and an associated plastic deformation of the metal band 6. It can also be seen in FIG. 2B that the thrust body 3, together with the bumper 5 fastened thereto, has been pushed to the left, into the guide 4 of the body component 2 (the previous position is illustrated by dashed lines). For this purpose, the thrust body 3 has detached from the optional retaining arms 9 at the predetermined breaking points 10. The action of the thrust body 3 being pushed into the guide 4 of the body component 2 causes a tensile load to be exerted on the metal band 6, which in turn leads to intense stretching of the metal band 6. As it stretches, the metal band 6 absorbs the energy of the collision, without the other components, in particular the body component 2, being damaged in the process, and said metal band can be exchanged relatively easily and inexpensively after the collision. Furthermore, the action of the thrust body 3 being pushed into the guide 4 of the body component 2 leads to a decrease in a spacing 12 between the body component 2 and the bumper 5 to a smaller spacing 12'. The difference between the spacing 12 before the collision (FIG. 2A) and the spacing 12' after the collision (FIG. 2B) defines the deformation path.

A special feature of the device 11 shown in FIG. 2A and FIG. 2B lies in the fact that the three deviating points 8a, 8b, 8c are mounted so as to be displaceable and fixable relative to the body component 2. The deviating points 8a, 8b, 8c can be displaced parallel to a central axis 13 of the device 11 in both directions (illustrated by arrows in FIG. 2A and FIG. 2B). The displaceability may be realized for example by virtue of the deviation points 8a, 8b, 8c having a circular cross section and being guided in elongate bores or grooves 14a, 14b, 14c which are arranged in the body component 2. It is nevertheless possible for the deviating points 8a, 8b, 8c to be fixed, for example by screw connections, in any position that they can assume within the bores or grooves 14a, 14b, 14c owing to their mobility. In order to make the deviating points 8a, 8b, 8c particularly easily accessible, the hollow thrust body 3 is designed to be open at its (rear) side assigned to the body component 2. Furthermore, the thrust body 3 may be designed to be open at two of the four side surfaces as far as an edge 15, for example at the top side and at the bottom side.

The adjustability or displaceability of the deviating points 8a, 8b, 8c has numerous effects: firstly, owing to the adjustability or displaceability of the deviating points 8a, 8b, 8c, it can be achieved—even with an unchanged length of the metal band 6—that the spacing 12 between the body component 2 and the bumper 5 can be individually adapted. For this purpose, it is for example the case that all three deviating points 8a, 8b, 8c are displaced in the direction of the bumper 5 (increasing the spacing 12) or in the direction of the guide 4 (decreasing the spacing 12). This may be necessary for example when the device 11 is used in vehicle models of similar weight but of different length.

A further effect of the adjustability or displaceability of the deviating points 8a, 8b, 8c lies in the fact that—even for an unchanged spacing 12—metal bands 6 of different length can be used. For this purpose, it is for example the case that the two outer deviating points 8a and 8c are displaced in the direction of the guide 4, whereas the inner deviating point 8b is displaced in the direction of the bumper 5 (shortening the metal band 6) or vice versa (lengthening the metal band 6). By varying the length of the metal bands 6, the amount of energy that can be absorbed by the metal band 6 can be adjusted. This may be necessary for example when the device 11 is used in vehicle models of different weight but of similar length.

Figure 3A:
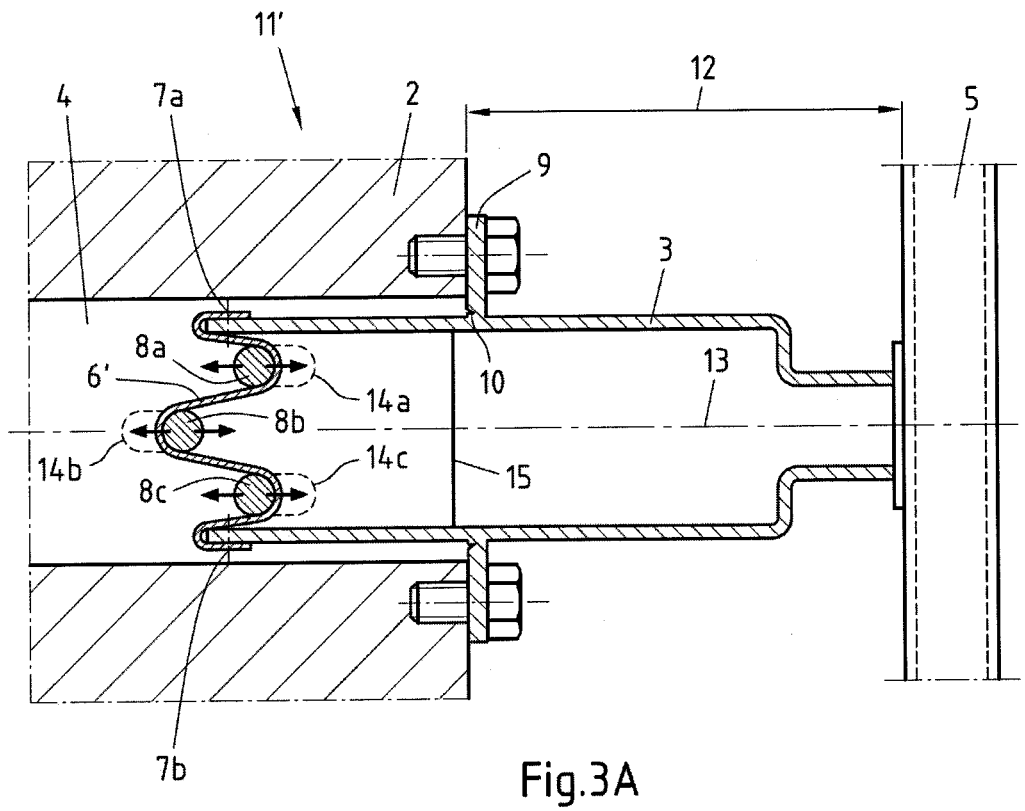
FIG. 3A shows a second embodiment of a device according to the invention for absorbing energy in the event of a vehicle collision, in the unloaded state and in a plan view.

FIG. 3A shows a second embodiment of a device 11' according to the invention for absorbing energy in the event of a vehicle collision, in the unloaded state and in a plan view. The features already described in conjunction with FIG. 1A to FIG. 2B are denoted by the same reference signs in FIG. 3A. The main difference between the device 11' shown in FIG. 3A and the device 11 illustrated above lies in the fact that, owing to a displacement of the three deviating points 8a, 8b, 8c, it is possible in the device 11' for a shorter metal band 6' to be used than the metal band 6 in the case of the device 11 described above. A shorter metal band 6' can stretch only to a relatively small extent during its deformation, and can thus also only absorb less energy. Therefore, the use of relatively short metal bands 6' is expedient in particular in the case of relatively lightweight vehicles. Despite the shorter length of the metal band 6', it is possible, with corresponding setting of the deviating points 8a, 8b, 8c, to set the same size of spacing 12 as before between the body component 2 and the bumper 5.

Figure 3B:
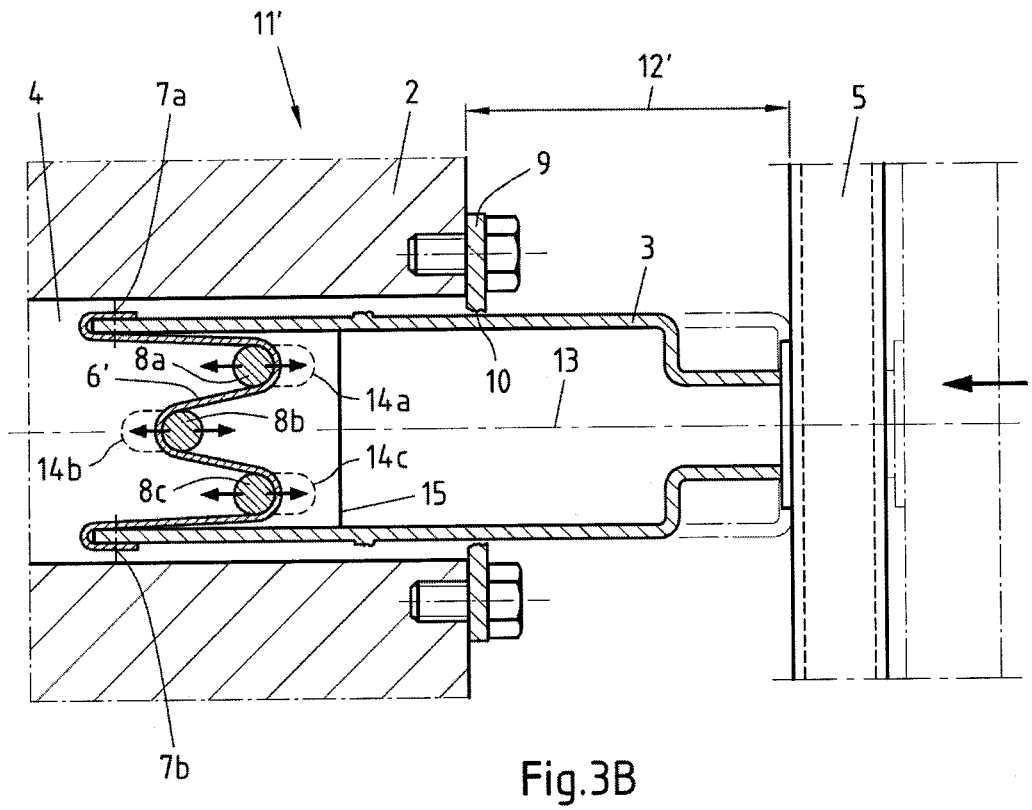
FIG. 3B shows the device from FIG. 3A in the loaded state.

FIG. 3B illustrates the device from FIG. 3A in the loaded state. The features already described in conjunction with FIG. 1A to FIG. 3A are also denoted by the same reference signs in FIG. 3B. FIG. 3B also shows, similarly to FIG. 1B and FIG. 2B, a state after a collision and an associated plastic deformation of the metal band 6'. It can be seen in FIG. 3B, too, that the thrust body 3, together with the bumper 5 fastened thereto, has been pushed to the left, into the guide 4 of the body component 2 (the previous position is illustrated by dashed lines). For this purpose, the thrust body 3 has detached from the optional retaining arms 9 at both predetermined breaking points 10. The action of the thrust body 3 being pushed into the guide 4 of the body component 2 causes a tensile load to be exerted on the metal band 6', which in turn leads to stretching of the metal band 6'. As it stretches, the metal band 6' absorbs the energy of the collision, without the other components, in particular the body component 2, being damaged in the process, and said metal band 6' can be exchanged relatively easily and inexpensively after the collision. Furthermore, the action of the thrust body 3 being pushed into the guide 4 of the body component 2 leads to a decrease in a spacing 12 between the body component 2 and the bumper 5 to a smaller spacing 12'. In this case, too, the deformation path that is covered is defined by the difference between the spacing 12 before the collision (FIG. 3A) and the spacing 12' after the collision (FIG. 3B).

It is possible for a preferably longer metal band to be provided in relation to the prior art, whereby, in particular, critical stretching that could lead to rupture or failure is encountered only when the thrust body reaches correspondingly relatively large depths of penetration. If the deviating points move toward one another in their elongate holes owing to the tensile force of the metal band under the exertion of load, then it is possible, by virtue of the deviating points being fixed in non-positively locking fashion, for example by way of a screw connection, for energy to already be absorbed before the metal band itself undergoes plastic deformation.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

We claim:

1. A device for absorbing energy in the event of a vehicle collision, comprising:
    a body component of a motor vehicle;
    a thrust body for transmitting force; and
    a metal band for absorbing energy;
    wherein the body component has a guide for the thrust body;
    wherein the body component has at least one fastening point or deviating point for the fastening or deviating of the metal band;
    wherein the thrust body has at least one fastening point or deviating point for the fastening or deviating of the metal band;
    wherein the metal band is coupled to the fastening points or deviating points of the body component and to the fastening points or deviating points of the thrust body such that the metal band is subjected to a tensile load when the thrust body is pushed into the guide of the body component; and
    wherein at least one fastening point or deviating point is mounted so as to be movable and fixable relative to at least one of the body component and the thrust body.

2. The device according to claim 1, wherein the thrust body has two fastening points for the fastening of the metal band.

3. The device according to claim 2, wherein the metal band is detachably connected to the thrust body at the fastening points.

4. The device according to claim 2, wherein the metal band is permanently connected to the thrust body at the fastening points.

5. The device according to claim 1, wherein the thrust body is detachably connected to the body component.

6. The device according to claim 1, wherein the thrust body is detachably connected to a bumper.

7. The device according to claim 1, wherein the body component is a longitudinal member of the vehicle.

8. The device according to claim 1, wherein the body component has at least one deviating point for the deviating of the metal band.

9. The device according to claim 8, wherein at least one of the deviating points is mounted so as to be movable and fixable relative to the body component.

10. Device according to claim 9, wherein the deviating points have a circular cross section and are guided in elongate bores or grooves which are arranged in the body component.

11. Device according to claim 1, wherein the metal band is produced from steel.

12. Device according to claim 11, wherein the metal band has a length in the range between 150 mm and 300 mm.

13. Device according to claim 12, wherein the metal band has a width in the range between 50 mm and 100 mm.

14. Device according to claim 13, wherein the metal band has a thickness in the range between 0.3 mm and 1.5 mm.

15. A device for absorbing energy in the event of a vehicle collision, comprising:
    a body component of a motor vehicle;
    a thrust body for transmitting force; and
    a metal band for absorbing energy;
    wherein the body component has a guide for the thrust body;
    wherein the body component has a deviating point for the deviating of the metal band;
    wherein the thrust body has a fastening point for the fastening of the metal band;
    wherein the metal band is coupled to the deviating point of the body component and to the fastening point of the thrust body such that the metal band is subjected to a tensile load when the thrust body is pushed into the guide of the body component; and
    wherein a distance between the deviating point and the fastening point is selectively adjustable.

16. The device according to claim 15, wherein the thrust body has another fastening point for the fastening of the metal band.

17. The device according to claim 16, wherein the thrust body is detachably connected to the body component.

18. The device according to claim 16, wherein the thrust body is detachably connected to a bumper.

19. A device for absorbing energy in the event of a vehicle collision, comprising:
    a body component of a motor vehicle;
    a thrust body for transmitting force; and
    a metal band for absorbing energy;
    wherein the body component has a guide for the thrust body;
    wherein the body component has a plurality of deviating points for the deviating of the metal band;
    wherein the thrust body has a plurality of fastening points for the fastening of the metal band;
    wherein the metal band is coupled to the plurality of deviating points and to the plurality of fastening points such that the metal band is subjected to a tensile load when the thrust body is pushed into the guide of the body component; and
    wherein a distance between at least one of the deviating points and at least one of the fastening points is selectively adjustable.

* * * * *